United States Patent
Morita et al.

(10) Patent No.: US 10,020,771 B2
(45) Date of Patent: Jul. 10, 2018

(54) MOTOR CONTROLLER, MOTOR CONTROL METHOD, AND NON-TRANSITORY COMPUTER-READABLE MEDIUM ENCODED WITH MOTOR CONTROL PROGRAM

(71) Applicant: FANUC CORPORATION, Yamanashi (JP)

(72) Inventors: Yuuki Morita, Yamanashi (JP); Tomohisa Tsutsumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/431,406

(22) Filed: Feb. 13, 2017

(65) Prior Publication Data
US 2017/0237384 A1    Aug. 17, 2017

(30) Foreign Application Priority Data
Feb. 17, 2016 (JP) .................. 2016-028201

(51) Int. Cl.
H02P 27/08 (2006.01)
H02P 29/64 (2016.01)

(52) U.S. Cl.
CPC .............. *H02P 29/64* (2016.02); *H02P 27/08* (2013.01)

(58) Field of Classification Search
None
See application file for complete search history.

(56) References Cited

U.S. PATENT DOCUMENTS

| | | | | |
|---|---|---|---|---|
| 4,430,681 A | * | 2/1984 | Benzing | H02H 7/0833 310/68 C |
| 5,162,710 A | * | 11/1992 | Reinhart | H02H 7/0833 318/400.08 |
| 5,635,806 A | * | 6/1997 | Wissmach | H02H 5/04 318/245 |
| 5,744,927 A | * | 4/1998 | Hayashida | H02P 21/0003 318/599 |

(Continued)

FOREIGN PATENT DOCUMENTS

| JP | 2000-134990 A | 5/2000 |
|---|---|---|
| JP | 2009-189181 A | 8/2009 |

OTHER PUBLICATIONS

An Office Action issued by the Japanese Patent Office dated Feb. 27, 2018, which corresponds to Japanese Patent Application No. 2016-028201 and is related to U.S. Appl. No. 15/431,406; with English translation.

(Continued)

*Primary Examiner* — Bentsu Ro
(74) *Attorney, Agent, or Firm* — Studebaker & Brackett PC

(57) ABSTRACT

A motor controller, a motor control method, and a motor control program are provided, all of which are capable of appropriately suppressing temperature elevation in a motor, while protecting an amplifier. A motor controller for driving a motor by way of pulse width modulation includes: a temperature acquisition unit that acquires a temperature of a motor; a limiting value determination unit that determines, based on the temperature, a limiting current value for driving the motor; and a frequency determination unit that determines, based on the limiting value, a PWM frequency to be generated with an amplifier.

6 Claims, 2 Drawing Sheets

(56) References Cited

U.S. PATENT DOCUMENTS

| | | | | |
|---|---|---|---|---|
| 7,091,689 B2* | 8/2006 | Lee | ............................ | H02P 6/14 |
| | | | | 318/268 |
| 8,975,843 B2* | 3/2015 | Minato | .................... | F04B 15/02 |
| | | | | 318/400.01 |
| 9,225,283 B2* | 12/2015 | Morita | ..................... | H02P 27/08 |

OTHER PUBLICATIONS

An Office Action issued by the Japanese Patent Office dated Apr. 17, 2018, which corresponds to Japanese Patent Application No. 2016-028201 and is related to U.S. Appl. No. 15/431,406; with English translation.

* cited by examiner

MOTOR CONTROLLER, MOTOR CONTROL METHOD, AND NON-TRANSITORY COMPUTER-READABLE MEDIUM ENCODED WITH MOTOR CONTROL PROGRAM

This application is based on and claims the benefit of priority from Japanese Patent Application No. 2016-028201, filed on 17 Feb. 2016, the content of which is incorporated herein by reference.

BACKGROUND OF THE INVENTION

Field of the Invention

The present invention relates to a motor controller, a motor control method, and a motor control program, all of which drive a motor by way of pulse width modulation.

Related Art

Conventionally, a rotation amount, speed or torque is controlled in a motor that drives machine tools, etc. A controller of the motor drives and controls the motor by determining a voltage instruction value based on various feedback values from the motor, modulating a voltage by way of a pulse width modulation (PWM) scheme, and applying the voltage to the winding of the motor.

Such a motor uses a maximum current during acceleration or deceleration, and is provided with a limiting current value so as to prevent overheating due to continuous use. Namely, the higher the motor temperature becomes, the lower the value of the current flowing through the motor will be restricted to.

Further, in the technical field of PWM control, it has been known that heat generation in a motor is also reduced by raising a pulse signal frequency (PWM frequency).

Meanwhile, when the PWM frequency is raised, the ON-OFF cycle of the switching elements in an inverter composing an amplifier will be shortened, which will in turn increase heat generation in the amplifier.

Therefore, a technique has been proposed, in which, when the motor temperature is low, the amplifier temperature is lowered by lowering the PWM frequency (for example, refer to Patent Document 1).

Patent Document 1: Japanese Unexamined Patent Application, Publication No. 2009-189181

SUMMARY OF THE INVENTION

However, the lowering of the PWM frequency to protect the amplifier will constitute a factor of raising the motor temperature. In contrast, in the case of adjusting the PWM frequency by monitoring the motor temperature and the amplifier temperature, the process to achieve a balance between the two temperatures is complicated; therefore, it has been difficult to appropriately control the motor temperature and the amplifier temperature.

An object of the present invention is to provide a motor controller, a motor control method, and a non-transitory computer-readable medium encoded with a motor control program, all of which are capable of appropriately suppressing temperature elevation in a motor, while protecting an amplifier.

A motor controller (e.g., a motor controller 1 to be described later) according to the present invention is a motor controller that drives a motor (e.g., a motor 3 to be described later) by way of pulse width modulation, in which the motor controller includes: a temperature acquisition unit (e.g., a temperature acquisition unit 11 to be described later) that acquires a temperature of the motor; a limiting value determination unit (e.g., a limiting value determination unit 12 to be described later) that determines, based on the temperature, a limiting current value for driving the motor; and a frequency determination unit (e.g., a frequency determination unit 13 to be described later) that determines, based on the limiting value, a PWM frequency to be generated with the amplifier (e.g., an amplifier 2 to be described later).

The frequency determination unit may compare the limiting value with a predetermined value, and if the limiting value is below the predetermined value, the frequency determination unit may determine a frequency that is higher than a frequency that should be determined if the limiting value is the predetermined value or above.

The predetermined value may be an allowable current value of the amplifier, in which the allowable current value is correspondingly set to each of a plurality of PWM frequencies.

A motor control method according to the present invention is a motor control method for driving a motor by way of pulse width modulation, in which a computer executes: a temperature acquiring step of acquiring a temperature of the motor; a limiting value determining step of determining, based on the temperature, a limiting current value for driving the motor; and a frequency determining step of determining, based on the limiting value, a PWM frequency to be generated with the amplifier.

A motor control program stored in a non-transitory computer-readable medium according to the present invention is a motor control program for driving a motor by way of pulse width modulation, in which the program causes a computer to execute: a temperature acquiring step of acquiring a temperature of the motor; a limiting value determining step of determining, based on the temperature, a limiting current value for driving the motor; and a frequency determining step of determining, based on the limiting value, a PWM frequency to be generated with the amplifier.

The present invention can appropriately suppress temperature elevation in a motor, while protecting an amplifier.

DETAILED DESCRIPTION OF THE INVENTION

One example of an embodiment of the present invention is hereinafter described.

Figure 1:
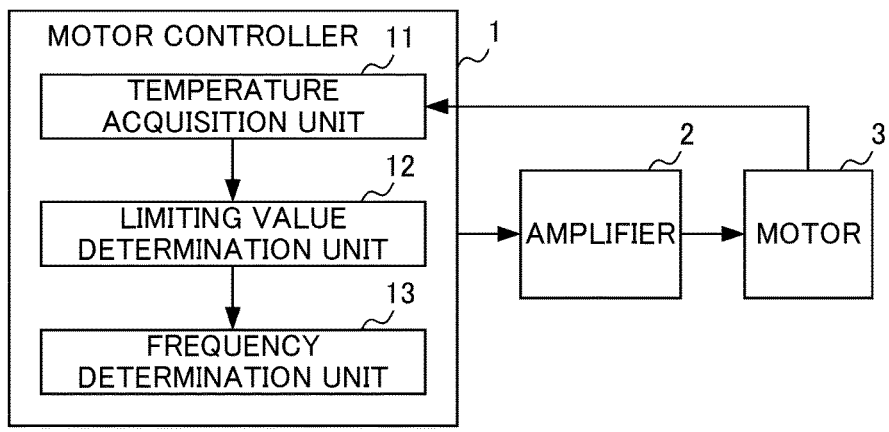
FIG. 1 is diagram illustrating a total configuration of a control system according to an embodiment.

FIG. 1 is diagram illustrating a total configuration of a control system including a motor controller 1 according to the present embodiment.

In the present embodiment, a spindle motor 3 of a machine tool is driven by way of a motor controller 1 via an amplifier 2. Note that the motor 3 is not limited to a spindle motor; and the techniques of the present embodiment can be applied to various motors having problems with suppressing temperature elevation during acceleration or deceleration.

In order to control a rotating speed of the motor 3, the motor controller 1 provides the amplifier 2 with instructions on a PWM frequency and a voltage value, based on feedback information from the motor 3.

The amplifier 2 converts the instructed voltage value into a pulse signal by way of a switching element, and applies the pulse signal to the motor 3, thereby controlling the current in the motor 3.

The motor 3 rotates the spindle by use of the current supplied from the amplifier, and provides the motor controller 1 with feedback on the rotating speed, etc. Further, in the present embodiment, temperature data is measured with a sensor attached to the winding of the motor, and is provided to the motor controller 1.

The motor controller 1 includes a temperature acquisition unit 11, a limiting value determination unit 12, and a frequency determination unit 13. These functional units are implemented by way of a control unit (CPU) that executes predetermined software (motor control program) stored in a storage unit.

The temperature acquisition unit 11 acquires a temperature of the motor 3. Specifically, the temperature acquisition unit 11 acquires a temperature of the winding of the motor 3 from the sensor. Note that the temperature acquisition means is not limited thereto; and a temperature sensor may be provided at a position where an equivalent temperature can be acquired, or a position where a temperature convertible to an equivalent temperature can be measured.

The limiting value determination unit 12 determines a limiting current value for driving the motor 3, based on the temperature acquired by way of the temperature acquisition unit 11.

The limiting value is a maximum current value during acceleration or deceleration of the motor 3. Since the motor 3 is normally accelerated or decelerated by use of the maximum current, the temperature of the motor 3 is likely to rise at this point in time. Therefore, as the temperature rises, the limiting current value will be set lower.

The frequency determination unit 13 determines a PWM frequency to be generated with the amplifier 2, based on the limiting value determined by way of the limiting value determination unit 12.

Specifically, the frequency determination unit 13 compares the limiting current value with a predetermined value, and if the limiting value is below the predetermined value, the frequency determination unit 13 determines a frequency that is higher than the frequency that should be determined if the limiting value is the predetermined value or above.

Here, the predetermined value is an allowable current value of the amplifier 2, in which the allowable current value is correspondingly set to each of the plurality of PWM frequencies. Namely, the frequency determination unit 13 compares the limiting current value with the allowable current value that has been set to a higher frequency among two PWM frequencies, and if the limiting value falls below the allowable current value, the frequency determination unit 13 switches the PWM frequency to the higher frequency in order to suppress temperature elevation in the motor 3. Meanwhile, if the comparison reveals that the limiting value has risen to the allowable current value or above, the frequency determination unit 13 switches the PWM frequency to a lower frequency in order to protect the amplifier 2.

Figure 2:
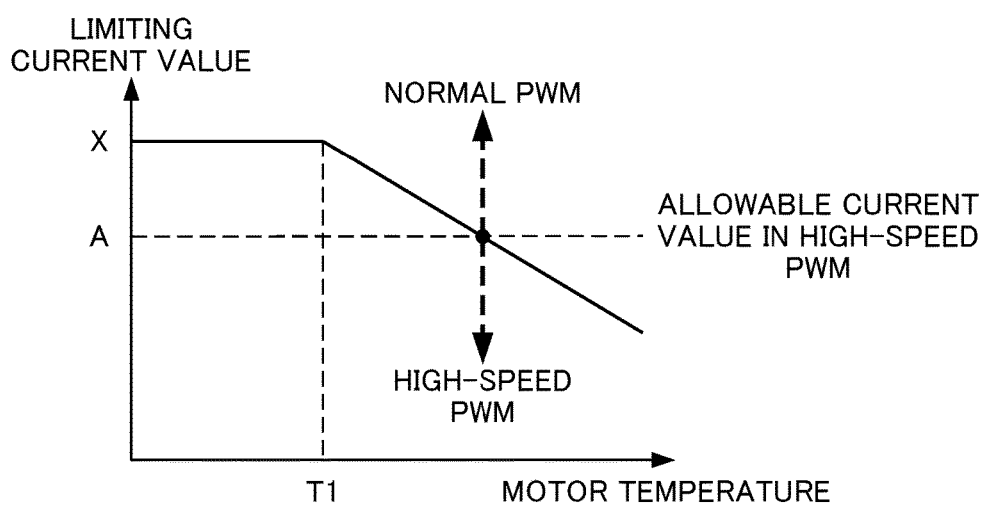
FIG. 2 is a graph illustrating a relationship between a motor temperature and a limiting current value according to the embodiment.

FIG. 2 is a graph illustrating a relationship between the motor temperature and the limiting current value according to the present embodiment.

As the temperature of the motor 3 rises, the limiting current value will be set lower in order to prevent the motor 3 from overheating. For example, the limiting value is maintained at a current value X (100% output) until the motor temperature reaches a predetermined temperature T1; and when the motor temperature exceeds the temperature T1, the limiting value will linearly fall in accordance with a difference between the motor temperature and the temperature T1.

The limiting value determination unit 12 may calculate such a limiting current value by way of a predetermined functional calculation. Alternatively, data defining the relationship between the temperature and the limiting value may be stored in advance, and the limiting value determination unit 12 may determine a limiting value extracted or interpolated by referring to such data.

In the case in which two types of PWM frequencies can be set up, when the temperature is a normal low temperature, a PWM frequency of a low-frequency side (normal PWM) is used.

In the case in which the motor 3 is continuously used, and the temperature rises above T1, the limiting current value will fall. At this time, use of a PWM frequency of a high-frequency side (high-speed PWM) can further suppress the temperature elevation, as compared to the case of only limiting the current; and an allowable current value A exists for the purpose of protecting the amplifier 2. The allowable value A is a maximum current value that is allowable in the case of using the high-speed PWM; and the high-speed PWM should not be used at a current value above the allowable value A.

Then, when the limiting current value of the motor 3 falls below the allowable value, the PWM frequency will be switched from the normal PWM to the high-speed PWM; and when the limiting current value resumes the allowable value or above, the PWM frequency will be switched from the high-speed PWM to the normal PWM.

Figure 3A:
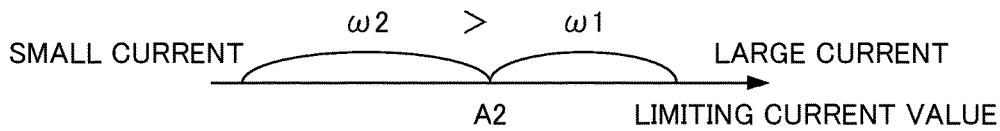
FIG. 3A is a diagram illustrating a relationship between an allowable current value and a PWM frequency according to the embodiment, in the case in which two types of PWM frequencies are alternately used.
Figure 3B:
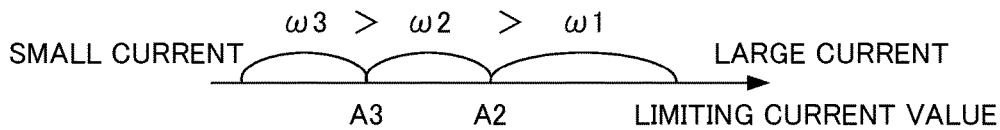
FIG. 3B is a diagram illustrating a relationship between an allowable current value and a PWM frequency according to the embodiment, in the case in which three types of PWM frequencies are alternately used.

FIGS. 3A and 3B are diagrams illustrating the relationship between the allowable current value and the PWM frequency, in the amplifier 2 according to the present embodiment.

PWM frequencies that are determined in the present embodiment are not limited to two types; and more than two types of PWM frequencies may be used.

FIG. 3A illustrates the case in which two types of PWM frequencies are alternately used.

In comparison with an allowable current value A2 in the amplifier 2 at a PWM frequency $\omega_2$ ($>\omega_1$) of a high-frequency side, the PWM frequency $\omega_2$ will be selected if the limiting current value of the motor 3 is lower than the allowable current value A2; and the PWM frequency $\omega_1$ will be selected if the limiting current value is higher than the allowable current value A2.

FIG. 3B illustrates the case in which three types of PWM frequencies are alternately used.

In the case in which PWM frequencies of $\omega_1 < \omega_2 < \omega_3$ are provided in this order from the low- to high-frequency side, an allowable current value A3 in the amplifier 2 is set to a PWM frequency $\omega_3$, and an allowable value A2 is set to the PWM frequency $\omega_2$.

With the allowable values A2 and A3 serving as the boundaries: when the limiting current value in the motor 3 is below A3, the PWM frequency ω3 will be selected; when the limiting current value is within a range from A3 inclusive to A2 exclusive, the PWM frequency ω2 will be selected; and when the limiting current value is A2 or higher, the PWM frequency ω1 will be selected.

Figure 4:
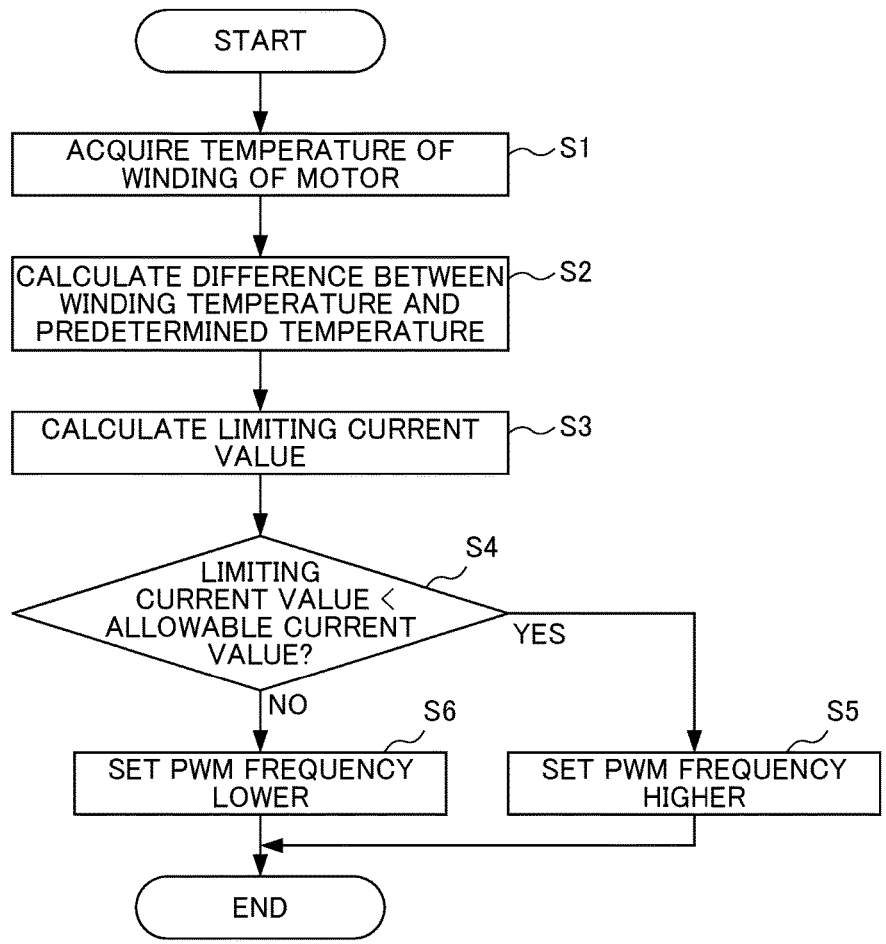
FIG. 4 is a flow chart illustrating the processing in a motor controller according to the embodiment.

FIG. 4 is a flow chart illustrating the processing in the motor controller 1 according to the present embodiment.

While the motor 3 is being driven, the control unit of the motor controller 1 executes the present processing, continuously or repeatedly in a predetermined cycle.

Note that, in the present processing, any one of two types of PWM frequencies is selected depending on the condition.

In Step S1, the temperature acquisition unit 11 acquires a temperature of the winding of the motor 3 from the sensor.

In Step S2, the limiting value determination unit 12 calculates a difference between the temperature of the winding acquired in Step S1 and a predetermined temperature (temperature T1 in FIG. 2).

In Step S3, the limiting value determination unit 12 calculates a limiting current value in the motor 3, based on the temperature difference calculated in Step S2.

In Step S4, the frequency determination unit 13 determines whether the limiting current value calculated in Step S3 is smaller than the allowable current value in the amplifier 2 at the PWM frequency of the high-frequency side. In the case in which the determination is YES, the processing advances to Step S5; and in the case in which the determination is NO, the processing advances to Step S6.

In Step S5, since the maximum current (at the limiting value) flowing through the amplifier 2 is below the allowable value of the high-speed PWM, the frequency determination unit 13 sets the PWM frequency to the high-frequency side.

In Step S6, since the current flowing through the amplifier 2 may exceed the allowable value of the high-speed PWM, the frequency determination unit 13 sets the PWM frequency to the low-frequency side.

As described above, according to the present embodiment, the motor controller 1 determines a PWM frequency to be generated with the amplifier 2, based on the limiting current value that is based on the temperature of the motor 3. Therefore, the motor controller 1 can determine, based on the current value, an appropriate PWM frequency that can protect the amplifier 2; therefore, temperature elevation in the motor 3 can be appropriately suppressed, while protecting the amplifier 2.

Further, since the motor controller 1 determines a higher or lower PWM frequency by comparing the limiting current value with the predetermined value, an appropriate PWM frequency for suppressing temperature elevation in the motor 3 can be easily determined within a range in which the amplifier 2 can be protected.

In addition, the allowable current value is set to each PWM frequency in the amplifier 2, and since the motor controller 1 uses the allowable current value as a threshold value, an appropriate PWM frequency can be determined within a range in which the amplifier 2 can be protected.

The embodiment of the present invention has been described above; however, the present invention is not limited to the above-described embodiment. Moreover, the effects described in the present embodiment are merely enumeration of preferable effects arising from the present invention; and the effects according to the present invention are not limited to those described in the present embodiment.

In the present embodiment, a PWM frequency is selected from a plurality of frequencies; however, a method for determining a frequency is not limited thereto. For example, a frequency may be determined through a predetermined calculation based on a limiting current value calculated.

The control method by way of the motor controller 1 is implemented by software. When implemented by software, a program(s) composing the software is/are installed in a computer (the motor controller 1). In addition, such a program(s) may be recorded in a removable medium and distributed to a user, or may be downloaded via a network so as to be distributed to a computer of the user. Further, instead of being downloaded, such a program(s) may be provided as a Web service through a network to the computer (the motor controller 1) of the user.

EXPLANATION OF REFERENCE NUMERALS

1: motor controller
2: amplifier
3: motor
11: temperature acquisition unit
12: limiting value determination unit
13: frequency determination unit

What is claimed is:

1. A motor controller that drives a motor by way of pulse width modulation, the motor controller comprising:
   a temperature acquisition unit that acquires a temperature of the motor;
   a limiting value determination unit that determines, based on the temperature, a limiting current value for driving the motor; and
   a frequency determination unit that determines, based on the limiting current value, a PWM frequency to be generated with an amplifier.

2. The motor controller according to claim 1, wherein the frequency determination unit determines, based on a comparison of the limiting current value with an allowable current value of the amplifier, the PWM frequency.

3. The motor controller according to claim 2, wherein the allowable current value is correspondingly set to each of a plurality of PWM frequencies.

4. The motor controller according to claim 2, wherein if the limiting current value is below the allowable current value, the frequency determination unit determines the PWM frequency that is higher than the PWM frequency that should be determined if the limiting current value is the allowable current value or above.

5. A motor control method for driving a motor by way of pulse width modulation, the method causing a computer to execute:
   a temperature acquiring step of acquiring a temperature of the motor;
   a limiting value determining step of determining, based on the temperature, a limiting current value for driving the motor; and
   a frequency determining step of determining, based on the limiting current value, a PWM frequency to be generated with an amplifier.

6. A non-transitory computer-readable medium encoded with a motor control program for driving a motor by way of pulse width modulation, the program causing a computer to execute:
   a temperature acquiring step of acquiring a temperature of the motor;

a limiting value determining step of determining, based on the temperature, a limiting current value for driving the motor; and a frequency determining step of determining, based on the limiting current value, a PWM frequency to be generated with an amplifier.

\* \* \* \* \*